(12) United States Patent
Alexander et al.

(10) Patent No.: US 10,583,909 B2
(45) Date of Patent: Mar. 10, 2020

(54) AIRCRAFT COMPRISING A FOLDABLE AERODYNAMIC STRUCTURE AND A METHOD OF MANUFACTURING A FOLDABLE AERODYNAMIC STRUCTURE FOR AN AIRCRAFT

(71) Applicant: AIRBUS OPERATIONS LIMITED, Bristol (GB)

(72) Inventors: Stuart Alexander, Bristol (GB); John Randall, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 309 days.

(21) Appl. No.: 15/301,881

(22) PCT Filed: Apr. 2, 2015

(86) PCT No.: PCT/GB2015/051054
§ 371 (c)(1),
(2) Date: Oct. 4, 2016

(87) PCT Pub. No.: WO2015/150835
PCT Pub. Date: Oct. 8, 2015

(65) Prior Publication Data
US 2017/0029089 A1 Feb. 2, 2017

(30) Foreign Application Priority Data
Apr. 4, 2014 (GB) .................................. 1406104.8

(51) Int. Cl.
*B64C 3/56* (2006.01)
*B64C 3/40* (2006.01)
(Continued)

(52) U.S. Cl.
CPC .................. *B64C 3/56* (2013.01); *B64C 3/40* (2013.01); *B64C 3/42* (2013.01); *B64F 5/10* (2017.01); *Y02T 50/14* (2013.01)

(58) Field of Classification Search
CPC .... B64C 3/56; B64C 3/38; B64C 3/40; B64C 3/42; Y02T 50/14
See application file for complete search history.

(56) References Cited

U.S. PATENT DOCUMENTS 1,710,673 A * 4/1929 Bonney ..................... B64C 3/44
244/215
1,928,336 A * 9/1933 Kindelberger ............ B64C 3/56
244/49
(Continued)

FOREIGN PATENT DOCUMENTS

| CN | 1253532 | 5/2000 |
| CN | 101242992 | 8/2008 |

(Continued)

OTHER PUBLICATIONS

International Search Report and Written Opinion of the ISA for PCT/GB2015/051054, dated Jun. 9, 2015, 15 pages.
(Continued)

*Primary Examiner* — Michael H Wang
(74) *Attorney, Agent, or Firm* — Nixon & Vanderhye P.C.

(57) ABSTRACT

A method of manufacturing a foldable aerodynamic structure, such as a wing, for an aircraft. The wing (1) including an inner region (1) and an outer region (3) rotatable relative to the inner region between a flight configuration and a ground configuration. The method includes designing the foldable aerodynamic structure by determining the location and orientation of an Euler axis of rotation (11) about which the outer region rotates to achieve the ground configuration and determining a cut plane (13), perpendicular to that Euler axis, separating the inner and outer regions; and iteratively
(Continued)

repeating this process until a preferred cut plane (13) is obtained that satisfies at least one design criteria.

25 Claims, 8 Drawing Sheets

(51) Int. Cl.
*B64F 5/10* (2017.01)
*B64C 3/42* (2006.01)

(56) References Cited

U.S. PATENT DOCUMENTS

| | | | |
|---|---|---|---|
| 2,674,422 A | 4/1954 | Pellarini | |
| 2,961,196 A * | 11/1960 | Atkinson | B64C 3/40 244/46 |
| 3,439,890 A | 4/1969 | Stits | |
| 3,599,904 A * | 8/1971 | Condit | B64C 3/38 244/38 |
| 3,647,163 A * | 3/1972 | Swwwney | B64C 3/56 244/49 |
| 3,743,218 A * | 7/1973 | Sweeney | B64C 3/42 244/36 |
| 4,132,375 A * | 1/1979 | Lamar | B64C 5/08 244/90 R |
| 4,667,898 A * | 5/1987 | Greenhalgh | B64C 31/028 244/219 |
| 5,671,899 A * | 9/1997 | Nicholas | B64C 3/40 244/3.28 |
| 5,988,563 A | 11/1999 | Allen | |
| 6,361,279 B1 | 3/2002 | Rodde et al. | |
| 7,275,722 B2 | 10/2007 | Irving et al. | |
| 7,811,151 B2 * | 10/2010 | Conrad | A63H 27/007 244/63 |
| 8,083,185 B2 | 12/2011 | Konings et al. | |
| 8,651,431 B1 * | 2/2014 | White | B64C 23/076 244/218 |
| 2004/0159227 A1 * | 8/2004 | Richards | B64C 3/56 89/1.4 |
| 2005/0133672 A1 | 6/2005 | Irving et al. | |
| 2005/0218260 A1 * | 10/2005 | Corder | B64C 3/56 244/49 |
| 2008/0191099 A1 | 8/2008 | Werthmann et al. | |
| 2009/0200431 A1 * | 8/2009 | Konings | B64C 3/385 244/213 |
| 2010/0170995 A1 | 7/2010 | Maenz | |
| 2012/0228424 A1 | 9/2012 | Parker | |
| 2012/0280080 A1 | 11/2012 | Lubenow et al. | |
| 2012/0292436 A1 | 11/2012 | Karem | |
| 2013/0099060 A1 | 4/2013 | Dees et al. | |
| 2013/0292508 A1 * | 11/2013 | Fox | B64C 3/56 244/49 |
| 2013/0313356 A1 * | 11/2013 | Santini | B64C 3/56 244/49 |
| 2013/0341467 A1 * | 12/2013 | Sakurai | B64C 3/56 244/201 |

FOREIGN PATENT DOCUMENTS

| | | |
|---|---|---|
| CN | 103129735 | 6/2013 |
| DE | 20 2012 002 172 | 7/2012 |
| EP | 2 674 356 | 12/2013 |
| EP | 2 676 878 | 12/2013 |
| FR | 1002983 | 3/1952 |
| GB | 30194 | 12/1910 |
| GB | 299 212 | 10/1928 |
| GB | 447577 | 5/1936 |
| GB | 487049 | 6/1938 |
| GB | 627 121 | 7/1949 |
| WO | WO 2011/051699 | 5/2011 |

OTHER PUBLICATIONS

Search Report for GB 1406104.8, dated Oct. 9, 2014, 1 page.
"Grumman Avenger Folding Wing"—published before 2014, two pages.
"Grumman E-4 Hawkeye Folding Wing" Published before 2014, three pages.
JP Office Action cited in Patent Application No. 2016-560700 dated Jan. 29, 2019 with English Translation, 9 pages.

* cited by examiner

AIRCRAFT COMPRISING A FOLDABLE AERODYNAMIC STRUCTURE AND A METHOD OF MANUFACTURING A FOLDABLE AERODYNAMIC STRUCTURE FOR AN AIRCRAFT

RELATED APPLICATIONS

This application is the U.S. national phase of International Application No. PCT/GB2015/051054 filed Apr. 2, 2015, which designated the U.S. and claims priority to Great Britain Patent Application GB 1406104.8 filed Apr. 4, 2014, the entire contents of each of which are incorporated by reference.

BACKGROUND OF THE INVENTION

The present invention relates to aircraft and to methods of manufacturing an aircraft comprising a foldable aerodynamic structure.

There is a trend towards increasingly large passenger aircraft with higher performance efficiency (for example fuel burn reduction), for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

In some suggested designs, aircraft are provided with wings which may be rotated about an axis that is orientated at a compound angle, such that part of the wing is folded (for example upwardly, or downwardly, and rearwardly or forwardly), to reduce the span of the aircraft on the ground (compared to when the aircraft is configured for flight). However, a disadvantage with such arrangements (an example of which is the folding wing on the Grumman Avenger aircraft) is that they tend to require a series of secondary structures to be moved to avoid clashing between the inner and outer parts of the wing. Another disadvantage in folding wing designs more generally, is that the wing tends to have limited volume in the vicinity of the junction between the fixed and folded parts of the wing. In order to accommodate essential internal structure (e.g. ribs, spars or other support structure), and/or aircraft systems (e.g. actuators) within the wing, it may be necessary to redesign the internal layout of the wing, locally increase the wing volume in the vicinity of the junction, and/or significantly constrain the possible location of that junction.

The present invention seeks to mitigate at least some of the above-mentioned problems.

SUMMARY OF THE INVENTION

According to a first aspect of the invention, there is provided a method of manufacturing an aircraft wing, the wing comprising a fixed wing and a wing tip device at the tip of the fixed wing, wherein the wing tip device is rotatable relative to the fixed wing between a flight configuration for use during flight, and a ground configuration for use during ground-based operations, in which ground configuration the wing tip device is rotated relative to the fixed wing such that the span of the wing is reduced. The method comprises the steps of, designing the wing by: (a) determining the orientation of an Euler axis of rotation for rotating the wing tip device from the flight configuration to the ground configuration and then determining the location of a cut plane separating the fixed wing and the wing tip device, the cut plane being orientated normal to the Euler axis; or (b) determining the location and orientation of a cut plane separating the fixed wing and the wing tip device, and then determining the location of an Euler axis of rotation for rotating the wing tip device from the flight configuration to the ground configuration, the Euler axis being orientated normal to the cut plane. The method also comprises iteratively repeating step (a) or step (b) until a preferred cut plane is obtained that achieves one or more design criteria; and then manufacturing a wing according to this design.

By using the Euler axis of rotation and the cut plane in the design process, it can be ensured that the fixed wing and wing tip device do not clash during a rotation about the Euler axis. This negates the need for any secondary structures to be moved during folding.

Such a design process also enables a cut plane to be obtained that achieves one or more design criteria. In other words, the location and/or orientation of the preferred cut plane may be optimised to take into account specific requirements of the aircraft wing and may therefore be tailored to that specific wing. This gives the aircraft designer greater flexibility and may facilitate a more efficient integration of a folding wing tip device into a wing.

The one or more design criteria may comprise a selected position of the wing tip device in the ground configuration. For example, it may be desirable for the wing tip device to adopt a particular (selected) position in the ground configuration such that it exceeds a minimum ground clearance.

The one or more design criteria may comprise a selected actuation load threshold for actuating the wing tip device between the flight and ground configurations. The present invention recognises that the orientation of the cut plane can influence the actuation loads required to move the wing tip device. By having a shallow cut plane (and therefore an Euler axis that is at a relatively small angle from the vertical) the mass of the wing tip device need not be lifted particularly far (the movement to the ground configuration being primarily in the horizontal plane for a shallow cut plane). The present invention further recognises that the preferred cut plane can be tailored, in the design process, to achieve a particular (selected) actuation load for actuating the wing tip device.

The one or more design criteria may comprise a minimisation of interference with internal systems housed within the wing. For example, the preferred cut plane may be obtained in order to avoid a system, such as an actuator, in the wing.

The one or more design criteria may comprise a minimisation of interference with internal structure within the wing. For example, the preferred cut plane may be obtained in order to avoid intersecting a structure such as a rib, in the wing.

It will be appreciated that the internal system or structure, need not actually be physically present in the wing at this stage; it may be have been provisionally located in the wing as part of another design process.

The one or more design criteria may comprise a selection of the area of the interface, within the cut plane, between the fixed wing and the wing tip device. The one or more design criteria may comprise a selection of the distance, along the cut plane, between the upper surface of the wing and the lower surface of the wing. The area and/or distance along the cut plane may influence the load transfer between the wing tip device and the fixed wing.

The orientation of the Euler axis is preferably such that when the wing tip device is rotated about the axis, from the flight configuration to the ground configuration, the span of the structure is reduced.

Euler axis is preferably orientated at an angle to (i.e. not including being parallel or perpendicular to) all of three mutually perpendicular directions. The Euler axis is preferably at an angle to (i.e. not including being parallel or perpendicular to) the longitudinal direction. The Euler axis is preferably at an angle to (i.e. not including being parallel or perpendicular to) the lateral direction. The Euler axis is preferably at an angle to (i.e. not including being parallel or perpendicular to) the vertical direction. The vertical direction is preferably perpendicular to both the longitudinal and lateral directions. In some embodiments, the longitudinal, lateral and vertical directions may be in an absolute frame of reference (i.e. longitudinal is fore-aft, and lateral is port-starboard). In embodiments in which the structure is a wing, the longitudinal direction may be a chordwise direction; the lateral direction may be a spanwise direction. In other embodiments, it may be appropriate to use the longitudinal, lateral and vertical directions in a frame of reference local to the aerodynamic structure. For example, for a swept wing the longitudinal direction may instead be along the length of the wing, and the lateral direction may be along the width of the wing (i.e. from the leading to the trailing edges, measured perpendicular to the longitudinal direction).

The angle may be an acute angle. The acute angle may be positive or negative. The angle may be referred to as a compound angle.

The Euler axis is preferably orientated at a compound angle to a plane (i.e. a notional planar surface) containing the wing and more preferably containing the fixed wing (i.e. the plane generally containing the wing spar(s) and ribs of the fixed wing)).

The Euler axis is preferably at an angle of less than 45 degrees, and more preferably less than 25 degrees, from the vertical. The Euler axis may be at an angle of 15 degrees from the vertical axis. Having the Euler axis at a relatively small angle from the vertical has been found to be beneficial because it means that the weight of the wing tip device is only lifted a short vertical distance when the device is rotated (a relatively upright axis results in a relatively large component of fore-aft rotations rather than up-down rotation). There is also less likely to be a vertical clearance problem as the wing tip device rotates Furthermore, such an orientation of axis results in a shallow cut plane, which may enable a relatively long length of joint interface.

The Euler axis is perpendicular to the cut plane, thus the cut plane is preferably an oblique (i.e. non-vertical and non-horizontal) plane. The cut-surface is preferably at an angle (i.e. not including being parallel or perpendicular) to each of the planes containing the longitudinal, lateral and vertical directions.

The method comprises iteratively repeating step (a) or step (b) until a preferred cut plane is obtained that achieves one or more design criteria. The iterative processes is preferably conducted until the preferred Euler axis and cut plane are established.

It will be appreciated that step (a) and/or step (b) may be performed. In some embodiments of the invention, only step (a) is carried out. This is because it may be easiest when designing to start with an (initial) Euler axis orientation and work from there. In some other embodiments of the invention, only step (b) is carried out. This is because it may be easiest when designing to start with an (initial) cut plane orientation and/or location and work from there.

The determination of the location and/or orientation of the Euler axis may be such that the Euler axis passes close to, and preferably substantially passes through, the centroid, and more preferably the centre of mass, of the wing tip device. Such arrangements may be beneficial in minimising the capacity of the actuator required to rotate the wing tip device about the Euler axis. Such an arrangement may be especially beneficial when the wing tip device is a non-planar wing tip device (such as a winglet).

The wing tip device is moveable between the flight configuration and the ground configuration. The wing tip device may also be moveable to an intermediate configuration between these two configurations. The wing tip device may be rotatable relative to the fixed wing between the flight configuration and a flight control configuration for use during flight. In the flight control configuration, the wing tip device of the aerodynamic structure may be rotated a small proportion of the way towards or away from the ground configuration, such that when in the flight control configuration the loading on the wing is altered to control flight (for example, the flight direction, attitude and/or flight load distribution acting on the wing such as gust load alleviation). In such an arrangement, the cut plane is preferably orientated at an angle to the direction of flight.

The wing tip device may be rotatable to/from the flight control configuration about the Euler axis. The one or more design criteria may comprises a selected position of the wing tip device in the flight control configuration.

The aircraft may comprises two foldable wings, each extending from opposing sides of the aircraft fuselage. In some embodiments of the invention, the ground configuration of each wing may be substantially identical (i.e. the aircraft is symmetric when both structures are in the ground configuration). However, the method may comprise the steps of: designing each of the foldable wings in accordance with embodiments of the invention described herein, the wing tip devices of each wing being arranged to rotate in opposite directions such that the outer regions are asymmetrically rotated when in the ground configuration. By having the aerodynamic structures rotating in opposite direction, the aircraft may be tailored to specific scenarios, such as ensuring ground vehicle, and/or apparatus access to aircraft doors (when loading/unloading payload) or wing-related ground operations such as re-fuelling or de-icing.

The wing tip device may be a wing tip extension; for example the wing tip device may be a planar tip extension. In other embodiments, the wing tip device may comprise, or consist of, a non-planar device, such as a winglet. In the flight configuration the trailing edge of the wing tip device is preferably a continuation of the trailing edge of the fixed wing. The leading edge of the wing tip device is preferably a continuation of the leading edge of the fixed wing, such that there is a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

According to another aspect of the invention there is provided a method of designing a wing, comprising the steps of designing described herein with reference to the method of manufacturing.

According to yet another aspect of the invention there is provided an aircraft comprising a wing, the wing comprising a fixed wing and a wing tip device at the tip of the fixed wing, the wing tip device being rotatable relative to the fixed wing between: a flight configuration for use during flight, and a ground configuration for use during ground-based operations, in which ground configuration the wing tip device is rotated relative to the fixed wing such that the span of the structure is reduced. The wing tip device is rotatable between the flight and ground configurations, about an Euler axis of rotation, and the fixed wing and wing tip device are separated along a cut plane, the cut plane being orientated normal to the Euler axis, such that the fixed wing and the wing tip device do not clash when rotating between the flight and ground configurations.

The cut plane is preferably a notional plane separating the fixed wing and the wing tip device (for example a cut plane created during the design phase of the wing). It will be appreciated that the cut plane need not necessarily manifest itself as a physical, planar, surface. The physical interface between the fixed wing and the wing tip device may, in reality have some structure that lies out of, or non-parallel to, the cut plane. These structural deviations from the cut plane are, however, preferably insufficient to cause clashing during rotation between the flight and ground configurations.

The cut plane preferably separates the fixed wing and the wing tip device along a single planar cut. In other words, the junction between the fixed wing and the wing tip device preferably lies in a single, oblique, plane (the cut plane).

In a preferred embodiment of the invention, the wing comprises at least some planar structure orientated parallel to the cut plane. The wing may comprise an interface between the fixed wing and of the wing tip device. The interface may comprise substantially planar structure orientated parallel to the cut-plane. The fixed wing may comprise a rib orientated substantially parallel to the cut plane. The wing tip device may comprise a rib orientated substantially parallel to the cut plane. These ribs of the fixed wing and of the wing tip device are preferably located at the interface between the fixed wing and wing tip device.

The Euler axis may be angled at a relatively small angle from the vertical, such that the cut plane is a relatively shallow cut. This may be advantageous from minimising the actuation loads for actuating the wing tip device.

The Euler axis may be angled outboard such that the cut plane creates an overcut with respect to the fixed wing.

The Euler axis may be angled inboard such that the cut plane creates an undercut with respect to the fixed wing.

Euler axis is preferably orientated at an angle to (i.e. not including being parallel or perpendicular to) all of three mutually perpendicular directions. The Euler axis is preferably at an angle to (i.e. not including being parallel or perpendicular to) the longitudinal direction. The Euler axis is preferably at an angle to (i.e. not including being parallel or perpendicular to) the lateral direction. The Euler axis is preferably at an angle to (i.e. not including being parallel or perpendicular to) the vertical direction.

The Euler axis may pass close to, and preferably substantially through, the centre of mass of the wing tip device. The Euler axis may pass close to, and preferably substantially through the centroid of the wing tip device. The aircraft may comprise an actuator arranged to effect rotation of the wing tip device region around the Euler axis. The actuator is preferably a rotary actuator.

The aircraft may comprise two of the wings according to this aspect of the invention. Each wing may extend from opposing sides of the aircraft fuselage, and the wing tip devices of each structure may be arranged to rotate in opposite directions such that the wing tip devices are asymmetrically rotated when in the ground configuration.

The aircraft may be any air vehicle such as a manned aircraft or a UAV. More preferably the aircraft is a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to another aspect of the invention, there is provided an aircraft comprising a wing manufactured in accordance with the method described herein.

According to another aspect of the invention, there is provided a wing tip device for use as the wing tip device as described herein.

The above-mentioned aspects of the invention are described herein with reference to a wing. However, the invention, may, in principle, be applicable to any foldable aerodynamic structure comprising an inner region and an outer region (rotatable relative to the inner region). According to further aspects of the invention, there is provided the method and apparatus claimed herein but in respect of an aerodynamic structure comprising an inner region and an outer region. References herein to the 'fixed wing' may be equally applicable to the 'inner region' and references herein to the wing tip device may be equally applicable to the 'outer region'.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
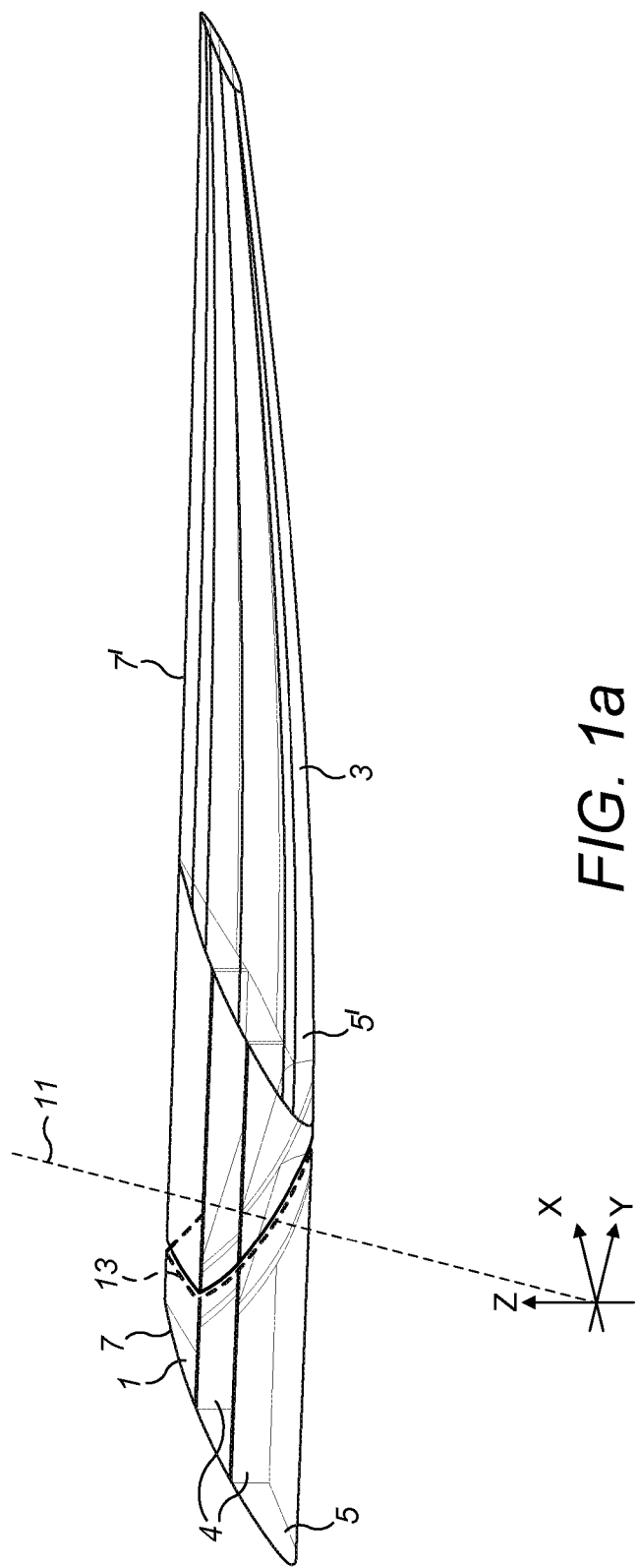
FIG. 1a shows a perspective view of a swept wing on a passenger aircraft according to a first embodiment of the invention.
Figure 1B:
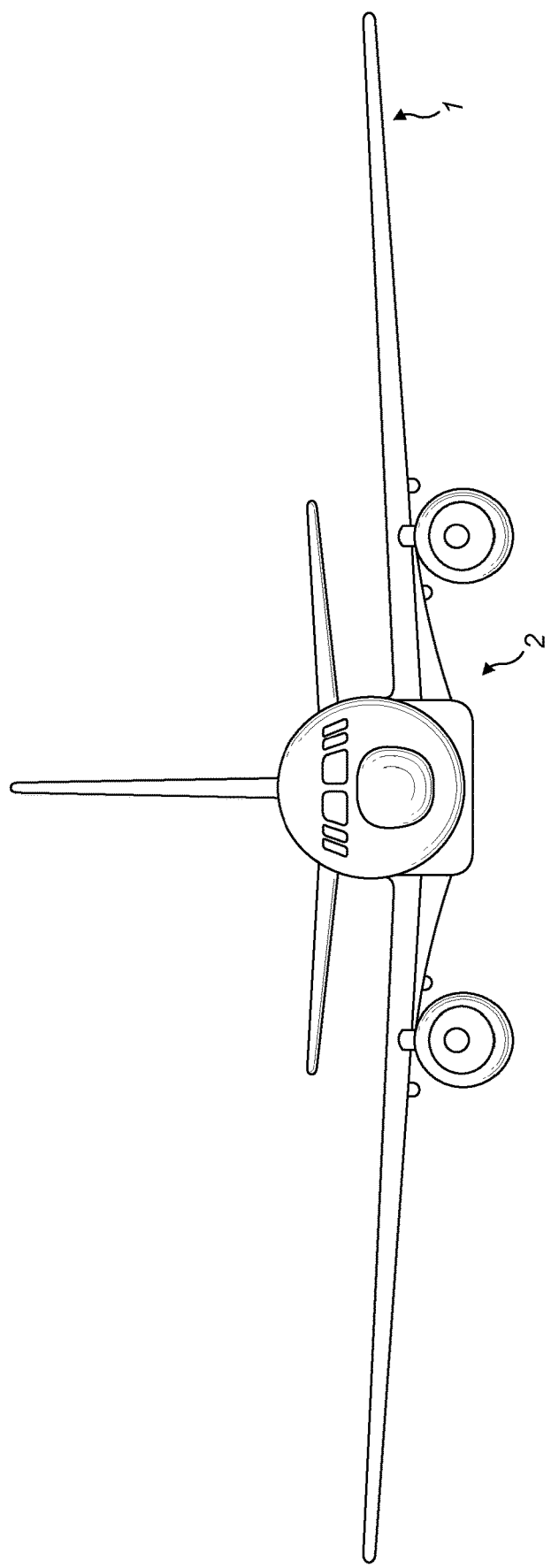
FIG. 1b shows a front view of the passenger aircraft according to the first embodiment of the invention.

FIG. 1a is a perspective view of a fixed wing 1 and a wing tip device 3 on an aircraft 2 (see FIG. 1b) according to a first embodiment of the invention. In the first embodiment, the wing tip device 3 is in the form of a planar wing tip extension, although the invention is also applicable to other types of wing tip device (such as winglets), and to other foldable aerodynamic structures per se.

Figure 2A:
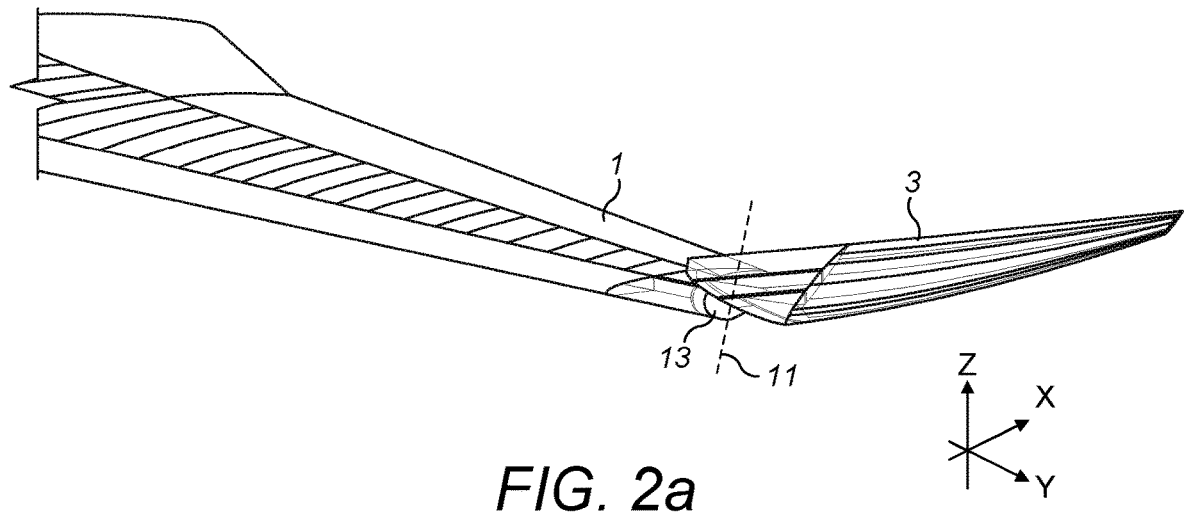
FIGS. 2a to 2c show perspective, plan and frontal views respectively of the wing of FIG. 1a, when the wing tip device is rotated about the Euler axis to a ground configuration.
Figure 2B:
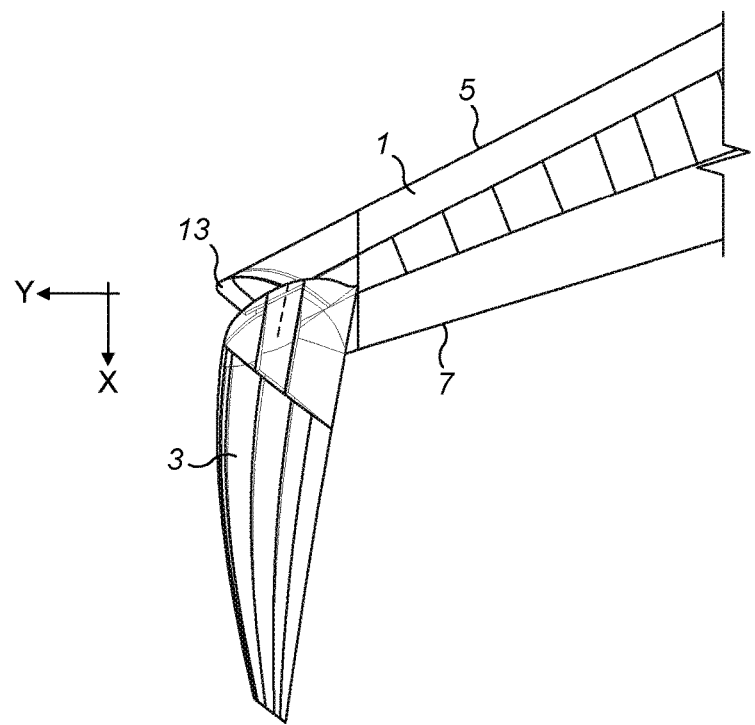
Figure 2C:
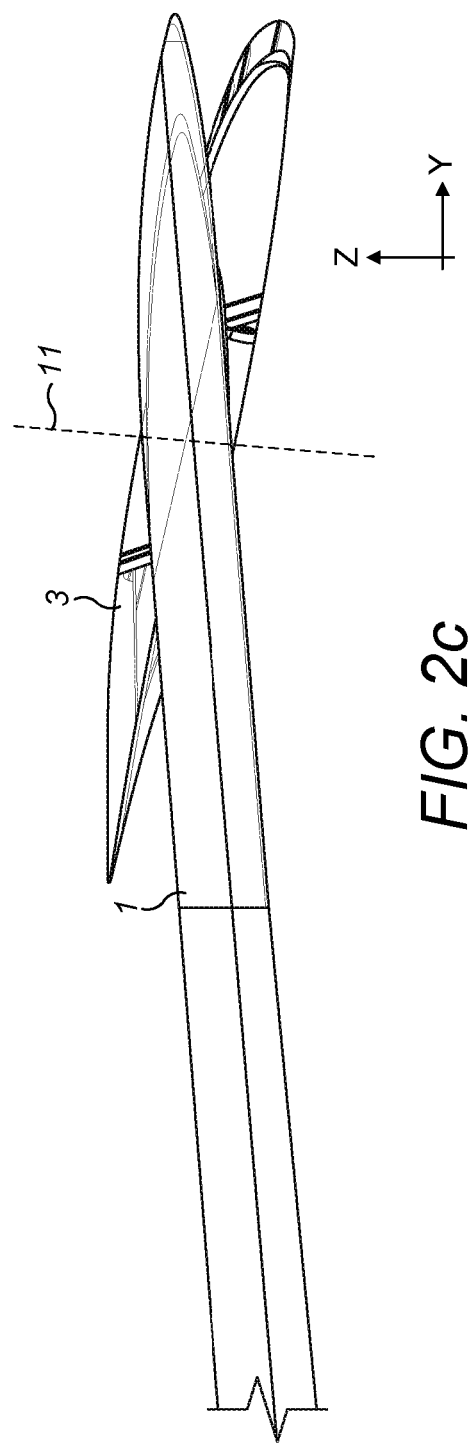

The wing tip device 3 is moveable between a flight configuration (FIG. 1a) and a ground configuration (FIGS. 2a to 2c). In the flight configuration, the leading and trailing edges 5', 7' of the wing tip device 3 are continuations of the leading and trailing edges 5, 7 of the fixed wing 1. Furthermore, the upper and lower surfaces of the wing tip device 3 device are continuations of the upper and lower surfaces of the fixed wing 1. Thus, there is a smooth transition from the fixed wing 1 to the wing tip device 3. The wing skins in FIG. 1a are shown in phantom such that some of the internal structures such as the spars 4 are visible.

The wing tip device 3 is placed in the flight configuration for flight. In the flight configuration, the wing tip device 3 thus increases the span of the aircraft (thereby providing beneficial aerodynamic effects, for example, reducing the component of induced drag and increasing the lift). In principle, it would be desirable to maintain this large span at all times and simply have a large fixed wing. However, the maximum aircraft span is effectively limited by airport operating rules which govern various clearances required when manoeuvring around the airport (such as the span and/or ground clearance required for gate entry and safe taxiway usage). Thus, in the first embodiment of the invention, the wing tip device 3 is moveable to a ground configuration for use when on the ground.

In the ground configuration (FIGS. 2a to 2c) the wing tip device 3 is folded, from the above-mentioned flight configuration, such that the wing tip device 3 rotates rearwards (aft), sweeping in a downward arc. FIG. 2a is a perspective view showing the wing tip device 3 in the ground configuration, FIG. 2b is a plan view showing the wing tip device 3 in the ground configuration, and FIG. 2c is a front view showing the wing tip device 3 in the ground configuration. As will be apparent, especially from FIG. 2b, by folding the wing tip device 3 in this manner, the span of the aircraft 2 is reduced. When the wing tip device 3 is in the ground configuration, the aircraft 2 thus complies with the above-mentioned airport clearances etc.

Changing the span of an aircraft is known per se. In some suggested designs, aircraft are provided with wings which may be folded, to reduce the span of the aircraft on the ground (compared to when the aircraft is configured for flight). However, a disadvantage with such arrangements (an example of which is the folding wing on the Grumman Avenger aircraft) is that they may require a series of secondary structures to be moved to avoid clashing between the inner and outer parts of the wing. Another disadvantage in folding wing designs more generally, is that the wing tends to have limited volume in the vicinity of the junction between the fixed and folding part of the wing. In order to accommodate essential internal structure (e.g. ribs, spars or other support structure), and/or aircraft systems (e.g. actuators) within the wing, it may be necessary to redesign the internal layout of the wing, locally increase the wing volume in the vicinity of the junction between the fixed wing and wing tip device, and/or significantly constrain the possible location of the junction.

Figure 3:
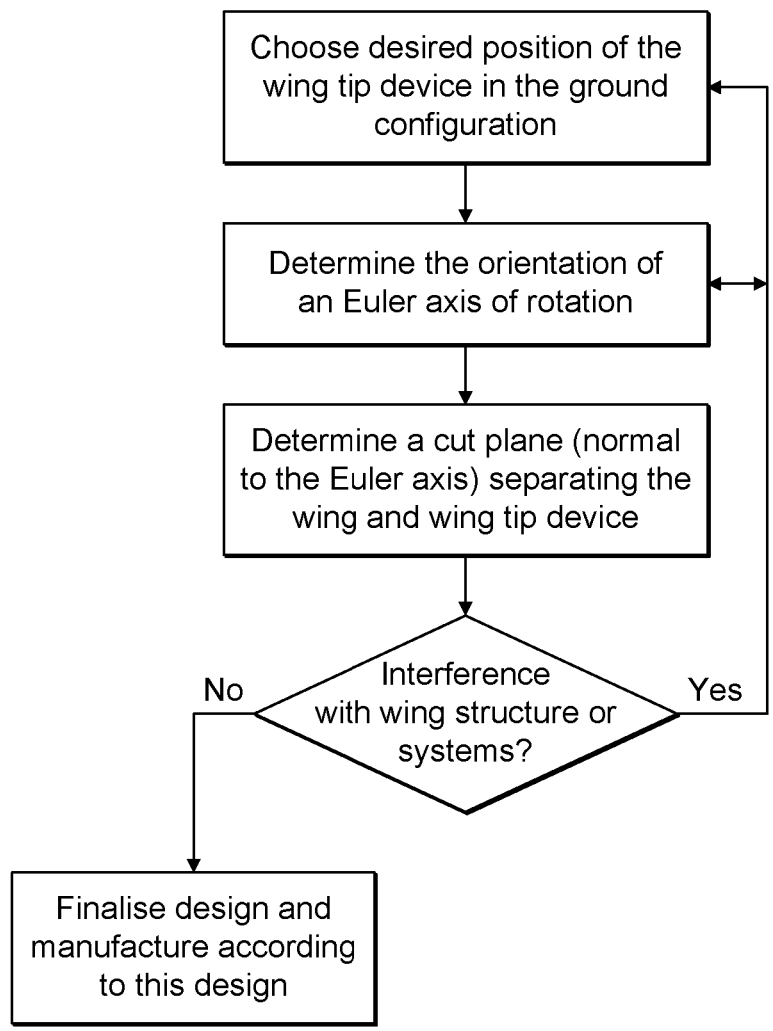
FIG. 3 is a flowchart showing the steps conducted to arrive at the fixed wing and wing tip device in FIGS. 1a to 2c.

The first embodiment seeks to address these problems. In the first embodiment of the invention, the aircraft fixed wing 1 and wing tip 3 have been designed using the process shown in FIG. 3.

Referring to all of FIGS. 1a to 3, the process begins by the designer choosing the preferred final position of the wing tip device 3 when in the ground configuration (FIGS. 2a, 2b, 2c). This is a first design criteria. In this embodiment it is desirable for the wing tip device to be rotated backwards in a downward arc (although in other embodiments different positions/movements may be desirable such as the wing tip device being rotated forwards in an upwards arc).

The designer then chooses a location and orientation of an Euler axis of rotation 11 about which the wing tip device 3 would need to rotate, from the flight configuration, to achieve the desired position in the ground configuration. In the first embodiment, the Euler axis 11 is at a compound angle to the plane of the wing such that the axis 11 extends out of the plane of the fixed wing (most clearly shown in FIG. 1a). The Euler axis is the axis about which the movement of the wing tip device may be described in a single rotation. In the first embodiment, the Euler axis is physically defined by the shaft of a rotary actuator (not shown), but in other embodiments the Euler axis may be a virtual axis about which the rotation movement of the wing tip device may be expressed.

The designer then determines, for example using a CAD package, a cut plane 13 separating the fixed wing 1 and the wing tip device 3. The cut plane 13 is a plane extending perpendicular to the Euler axis, that notionally separates the fixed wing 1 and the wing tip device 3. Since the cut plane 13 is perpendicular to the Euler axis 11, it ensures the fixed wing and the wing tip device do not clash during rotation of the wing tip device between the flight and ground configurations.

In initial steps of the design process, the cut plane may be such that it unduly interferes with aircraft structures or systems (not shown) within the wing. Thus, the designer repeats the above-mentioned steps until a cut plane 13 is obtained that avoids, or at least minimises, this interference. The minimising of interference of structures and systems is a second design criteria.

The finalised design, to which the foldable wing is later manufactured, is shown in FIGS. 1a to 2c. In the finalised design the Euler axis is orientated at an angle to all three mutually orthogonal directions (vertical Z, chordwise X, and spanwise Y). When the design process is complete, the Euler axis 11 is at an angle of 15 degrees from the vertical direction Z, and 45 degrees to the leading edge of the wing. In the absolute reference plane, the Euler axis is thus at an angle to the spanwise direction Y of 45 degrees+the local sweep angle. The angle to the chordwise direction X is 90 degrees offset from this. It will be appreciated that the angles to the spanwise and chordwise directions are measured based on a projection in the XY plane.

The embodiment of the invention thus facilitates a design of foldable wing which eliminates the need for complex secondary movements to prevent clashing. Furthermore, by iteratively modifying the Euler axis of rotation and the cut plane, the designer can achieve selected design criteria such as obtaining a particular location of wing tip device in the ground configuration, optimising the use of the wing volume in the vicinity of the junction between the wing and wing tip device, and minimising the interference with the structures and systems in the wing. The designer therefore has greater freedom and flexibility when designing the foldable wing.

FIGS. 1a to 2c show the port-side wing 1 of the aircraft. The starboard-side wing also has a wing tip device at the tip thereof. The designer uses substantially the same process as described above to determine the cut plane between the fixed wing and wing tip.

In an alternative embodiment (not shown) the port wing tip device in the ground configuration is rotated backwards, sweeping through a downward arc but for the starboard wing, the wing tip device is rotated forwards, sweeping through an upward arc. Thus the Euler axis and cut plane are substantially different on each opposing wing. Such an arrangement enables the wing tip devices to be counter-rotated in opposing directions, such that the aircraft can be tailored for use in specific circumstances for each side of the aircraft (for example to allow better access to cargo doors on one side, and better access to a re-fuelling coupling on the other side). In other embodiments, the wing tip devices may, of course, be arranged to rotate in the same direction, to substantially identical ground configurations.

Figure 4:
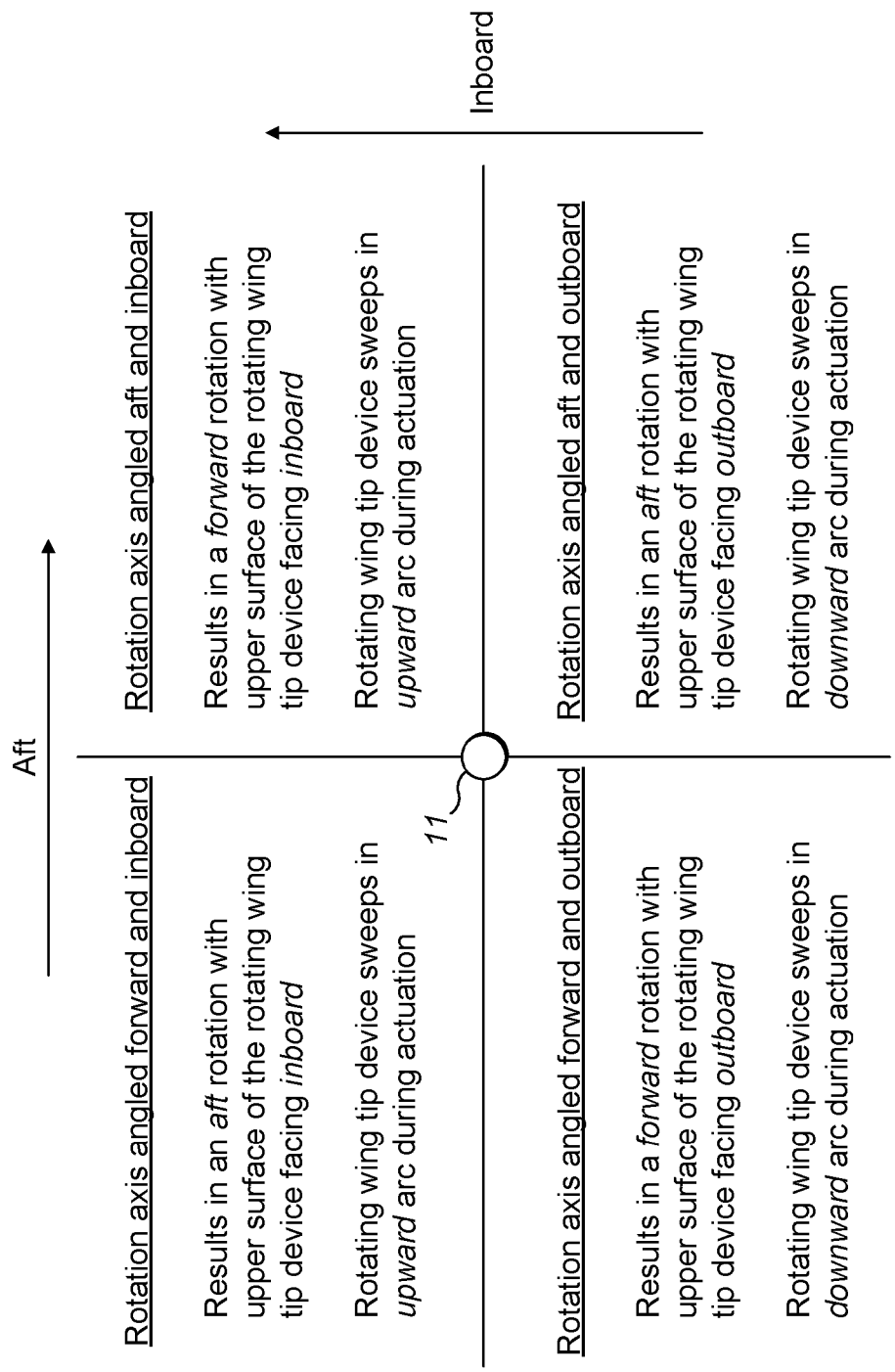
FIG. 4 is a chart showing the relationship between the angle of the Euler axis and the ensuing movement of the wing tip device.

It will be appreciated that by orientating the Euler axis in a particular way, the nature of the movement of the wing tip device can be altered. FIG. 4 is a chart showing the relationship between the angle of the Euler axis and the ensuing movement of the wing tip device. It represents a planform view of the rotation axis 11, with the dot in the centre representing a vertical axis. Taking the base of the rotation axis as fixed—pivoting the axis from this point into each of the four quadrants results in a wing rotation as described in the Figure. By way of example, in the first embodiment of FIGS. 1a to 2c, the axis is tilted aft and outboard, such that the movement is that shown in the bottom-right quadrant.

Figure 5A:
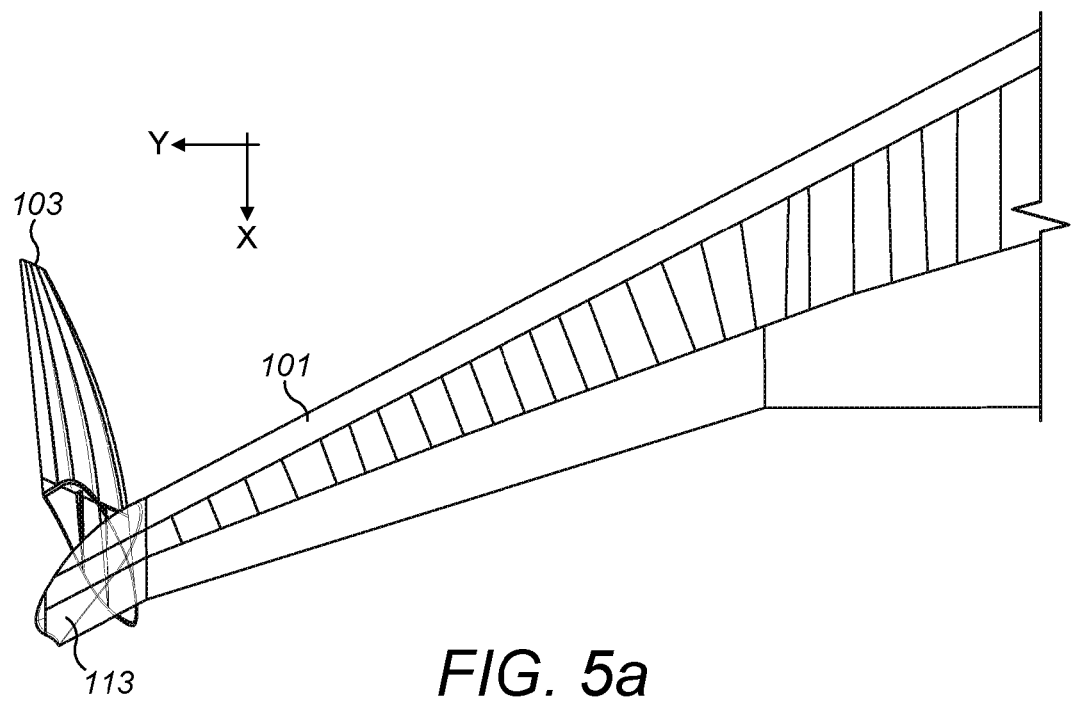
FIGS. 5a and 5b show plan and perspective views respectively of a wing on a passenger aircraft according to a second embodiment of the invention.
Figure 5B:
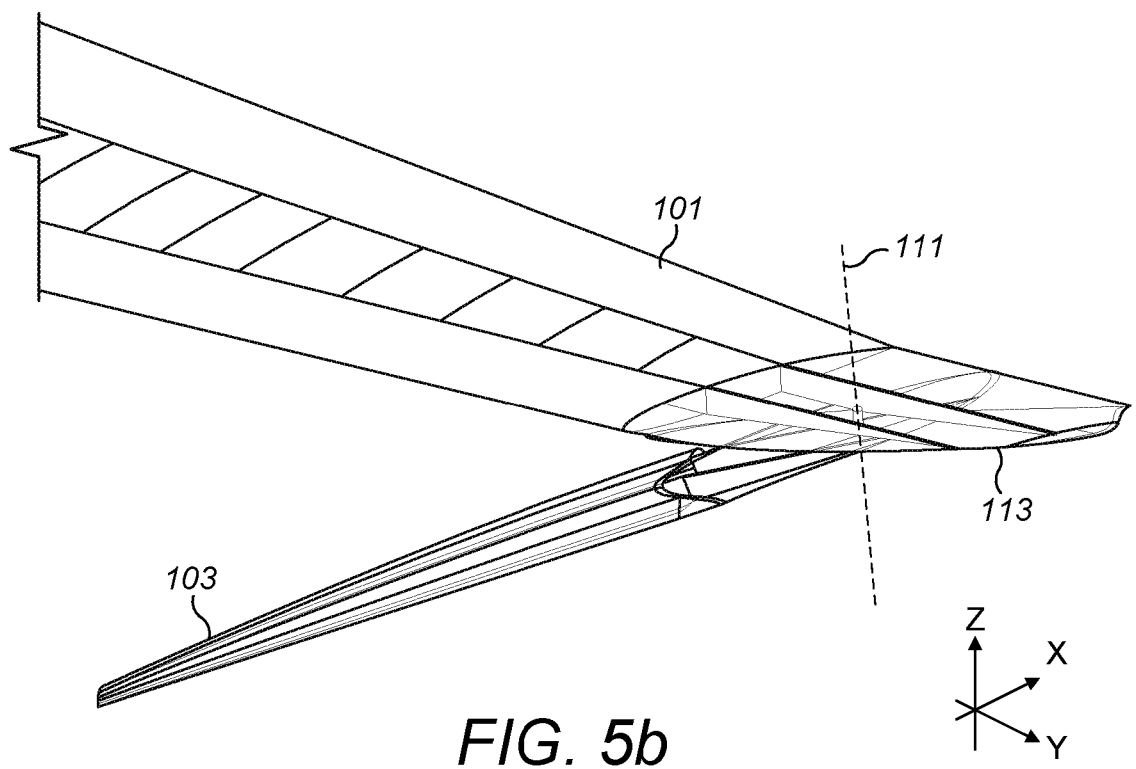

FIGS. 5a to 5b show a fixed wing and wing tip device designed in accordance with a second embodiment of the invention. Features in the second embodiment of the invention that correspond to similar features in the first embodiment of the invention, are shown with the same reference numerals as in the first embodiment, but with the addition of the prefix '1' (or '10' where appropriate).

The second embodiment is the same as the first embodiment except that the cut plane 113 is at a different angle to the wing chord; it extends inboard when moving from the trailing to the leading edge (in contrast to FIG. 1a where the cut plane extends outboard). The cut plane is also at a different angle to the vertical (i.e. it is further inboard on the wing lower surface than on the upper surface (in contrast to FIG. 1a where the cut plane is further outboard on the lower surface than on the upper surface). Accordingly, the Euler axis 111 is orientated at correspondingly different angles to the vertical, and to the spanwise and chordwise directions, resulting in a planar cut-surface 113 that undercuts the fixed wing 103. With reference to FIG. 4, this means that the movement is of the form described in the top-right quadrant, rather than the bottom-right quadrant as per the first embodiment.

Since the second embodiment results in forward rotation of the wing tip device 103, in an upward arc, it may provide improved access for ground service vehicles. Furthermore, it may be considered advantageous because the wing tip device would naturally be urged into the flight configuration under the influence of aerodynamic forces as the aircraft moves forward (which may be useful in the unlikely event the wing tip device 103 had not been correctly locked in the flight configuration).

Figure 6A:
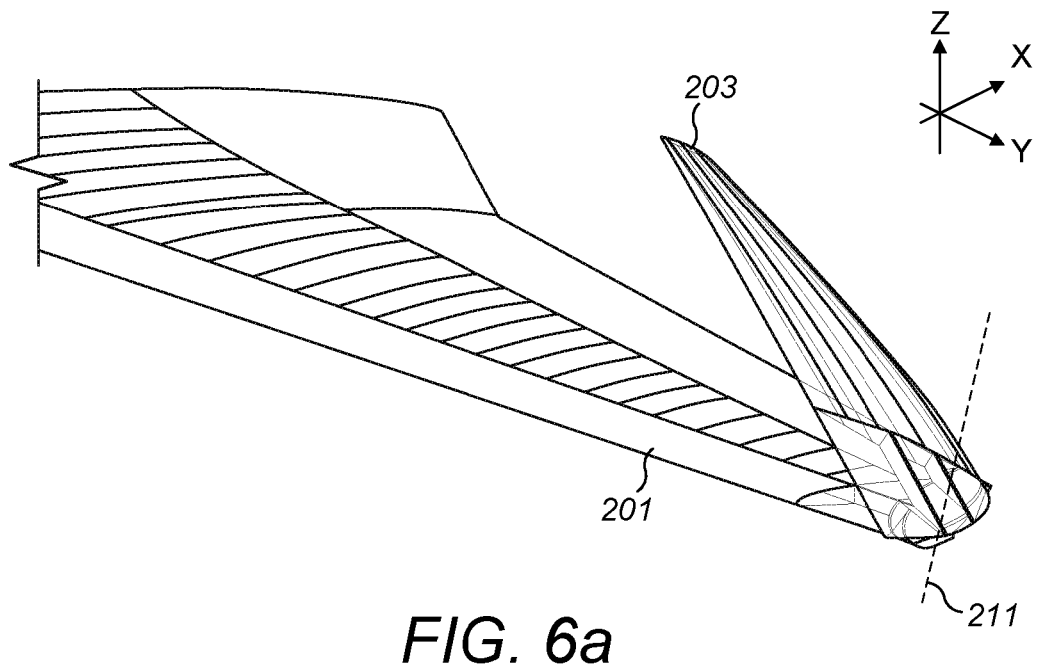
FIGS. 6a and 6b show plan and perspective views respectively of a wing on a passenger aircraft according to a third embodiment of the invention.
Figure 6B:
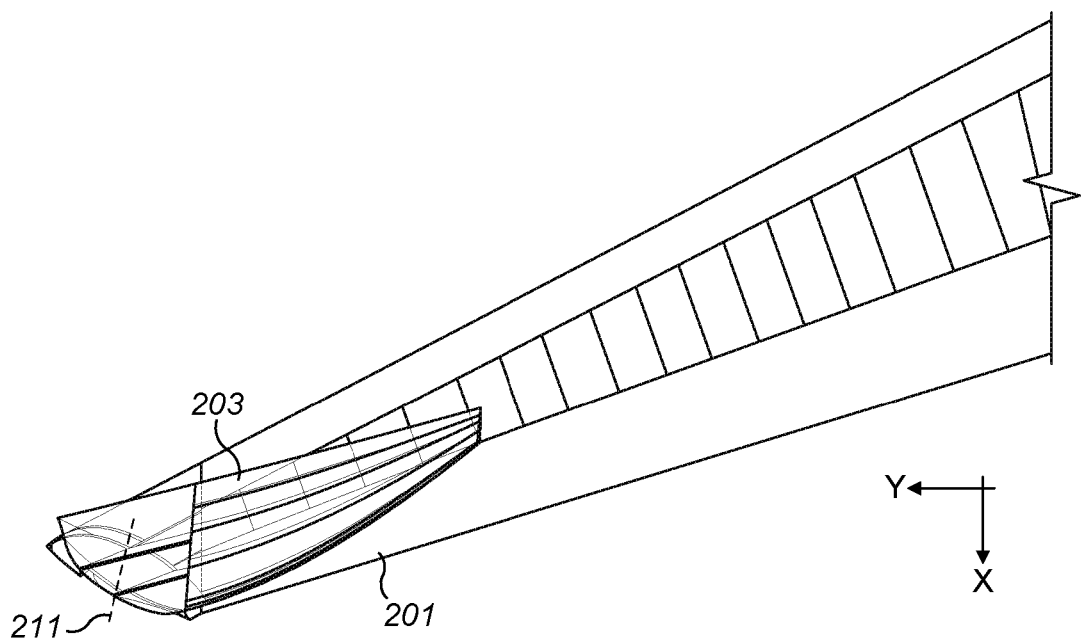

FIGS. 6a and 6b show a fixed wing and wing tip device designed in accordance with a third embodiment of the invention. Features in the third embodiment of the invention that correspond to similar features in the first embodiment of the invention, are shown with the same reference numerals as in the first embodiment, but with the addition of the prefix '2' (or '20' where appropriate). The third embodiment is the same as the first embodiment except that the wing tip device 203 is arranged to rotate further about the axis 211, such that in the ground configuration, the wing tip device 203 is located above the fixed wing 201. This may have advantages in improving service vehicle access. It may also mean that there are lower torsional loads applied to the wing box in the ground configuration because the weight of the wing tip device is above the wing box, rather than to one side of it (as per the first embodiment).

Whilst the present invention has been described and illustrated with reference to particular embodiments, it will be appreciated by those of ordinary skill in the art that the invention lends itself to many different variations not specifically illustrated herein. By way of example the outer region need not necessarily be a wing tip device; the aerodynamic structure may not necessarily be a wing, and may, for example be part of a tail plane, or a control surface; the aircraft need not necessarily be a passenger aircraft and may, for example, be a UAV.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of manufacturing an aircraft wing, the wing comprising a fixed wing and a wing tip device at the tip of the fixed wing, wherein the wing tip device is pivotable relative to the fixed wing between:

a flight configuration, for use during flight, in which a trailing edge of the wing tip device is aligned with the fixed wing to form a substantially continuous trailing edge along the wing tip device and the fixed wing, a leading edge of the wing tip device is aligned with a leading edge of the fixed wing to form a substantially continuous leading edge along the wing and wing tip device, an upper surface of the wing tip device is aligned with an upper surface of the fixed wing to form a substantially continuous upper surface of the wing and wing tip device, and a lower surface of the wing tip device is aligned with a lower surface of the fixed wing to form a substantially continuous lower surface of the fixed wing and wing tip device; and a ground configuration for use during ground-based operations, in which ground configuration the wing tip device is rotated relative to the fixed wing such that the span of the wing is reduced, the method comprising the steps of:
a) determining an orientation of an Euler axis of rotation for rotating the wing tip device from the flight configuration to the ground configuration and then determining a location of a cut plane separating the fixed wing and the wing tip device, the cut plane being orientated normal to the Euler axis, wherein an end of the fixed wing facing the cut plane includes ends of the leading and trailing edges and edges of the upper and lower surfaces of the fixed wing, and an end of the wing tip device facing the cut plane includes ends of the leading and trailing edges and edges of the upper and lower surfaces of the wing tip device and creating an overcut or an undercut by the wing tip device with respect to the fixed wing; or
b) determining a location and an orientation of the cut plane separating the fixed wing and the wing tip device and creating an overcut or an undercut with respect to the fixed wing, and then determining a location of the Euler axis of rotation for rotating the wing tip device from the flight configuration to the ground configuration, the Euler axis being orientated normal to the cut plane, and
iteratively repeating step (a) or step (b) until a preferred cut plane is obtained that achieves one or more design criteria; and
manufacturing a wing wherein the wing tip device and the fixed wing are separated along the preferred cut plane.

2. The method according to claim 1, wherein the one or more design criteria comprises at least one of:
 i. a selected position of the wing tip device in the ground configuration;
 ii. a selected actuation load threshold for actuating the wing tip device between the flight and ground configurations;
 iii. minimization of interference with internal systems housed within the wing;
 iv. minimization of interference with internal structure within the wing;
 v. a selection of the area of the interface, within the cut plane, between the fixed wing and the wing tip device; and/or
 vi. a selection of the distance, along the cut plane, between the upper surface of the wing and the lower surface of the wing.

3. The method according to claim 1, wherein the wing tip device is rotatable relative to the fixed wing between the flight configuration and a flight control configuration for use during flight, wherein while in the flight control configuration the wing tip device is rotated a small proportion of the way towards or away from the ground configuration, such that while in the flight control configuration the loading on the wing is altered to control flight.

4. The method according to claim 3, wherein the wing tip device is rotatable to/from the flight control configuration about the Euler axis, and the one or more design criteria comprises a selected position of the wing tip device in the flight control configuration.

5. The method according to claim 1, wherein the aircraft comprises two wings, each wing extending from opposing sides of the aircraft fuselage, and wherein the method further comprises the steps of:
designing each of the wings by iteratively repeating step (a) or step (b),
wherein the wing tip devices of each wing being arranged to rotate in opposite directions such that the wing tip devices are asymmetrically rotated when in the ground configuration.

6. The method of claim 1, wherein the Euler axis forms an acute angle is in a range of 15 to 45 degrees with respect to a vertical direction.

7. The method of claim 1, wherein the cut plane is parallel to both the end of the fixed wing and the end of the wing tip device.

8. An aircraft comprising a wing, the wing comprising a fixed wing and a wing tip device at the tip of the fixed wing, the wing tip device being rotatable relative to the fixed wing between:
a flight configuration, for use during flight, in which a trailing edge of the wing tip device is aligned with the fixed wing to form a substantially continuous trailing edge along the wing tip device and the fixed wing, a leading edge of the wing tip device is aligned with a leading edge of the fixed wing to form a substantially continuous leading along the wing and wing tip device, an upper surface of the wing tip device is aligned with an upper surface of the fixed to form a substantially continuous upper surface of the wing and wing tip device, and a lower surface of the wing tip device is aligned with a lower surface of the fixed wing to form a substantially continuous lower surface of the fixed wing and wing tip device; and
a ground configuration for use during ground-based operations, in which ground configuration the wing tip device is rotated relative to the fixed wing such that the span of the wing is reduced,
wherein the wing tip device is rotatable between the flight and ground configurations, about an Euler axis of rotation angled with respect to all three of a longitudinal direction, a lateral direction and a vertical direction, wherein the longitudinal, lateral and vertical directions are mutually perpendicular to one another, and
wherein the wing tip device and the fixed wing are separated along a cut plane that forms an overcut or an undercut by the wing tip device with respect to the fixed wing, the cut plane being orientated normal to the Euler axis, such that the fixed wing and the wing tip device do not clash when rotating between the flight and ground configurations,
wherein an end of the fixed wing facing the cut plane includes ends of the leading and trailing edges, and edges of the lower and upper surfaces of the fixed wing, and
wherein an end of the wing tip device facing the cut plane includes ends of the leading and trailing edges, and edges of the upper and lower surfaces of the wing tip device.

9. The aircraft according to claim 8, wherein the Euler axis is angled at an angle of 15 to 45 degrees from vertical.

10. The aircraft according to claim 8, wherein the Euler axis is angled outboard such that the cut plane creates an overcut with respect to the fixed wing.

11. The aircraft according to claim 8, wherein the Euler axis is angled inboard such that the cut plane creates the undercut of the wing tip device with respect to the fixed wing.

12. The aircraft according to claim 8, wherein the aircraft comprises two of the wings defined by claim 8, and each wing extends from opposing sides of a fuselage of the aircraft, and the wing tip devices of each wing being arranged to rotate in opposite directions such that the wing tip devices are asymmetrically rotated when in the ground configuration.

13. The aircraft according to claim 8, wherein in the flight configuration the trailing edge of the wing tip device is a continuation of the trailing edge of the fixed wing, the leading edge of the wing tip device is a continuation of the leading edge of the fixed wing, and the upper and the lower surfaces of the wing tip device are continuations of the upper and lower surfaces of the fixed wing, such that there is a smooth transition from the fixed wing to the wing tip device.

14. An aircraft comprising:
a fixed wing having a tip;
a wing tip device jointed to the tip of the fixed wing, wherein the wing tip device, while in a flight configuration, includes:
   a leading edge that is aligned with a leading edge of the fixed wing to form a substantially continuous leading edge of the wing tip device and the fixed wing;
   a trailing edge that is aligned with a trailing edge of the fixed wing to form a substantially continuous trailing edge of the wing tip device and the fixed wing;
   an upper surface that is aligned with an upper surface of the fixed wing to form a substantially continuous upper surface of the wing tip device and the fixed wing,
   a lower surface that is aligned with a lower surface of the fixed wing to form a substantially continuous lower surface of the wing tip device and the fixed wing;
wherein the wing tip device pivots with respect to the fixed wing about an Euler axis between the flight configuration and a ground configuration,
wherein the wing tip device and the fixed wing are separated along a cut plane that forms an overcut or an undercut of the wing tip device with respect to the fixed wing, the cut plane being orientated normal to the Euler axis;
wherein an end of the fixed wing facing the cut plane includes ends of the leading and trailing edges, and edges of the upper and lower surfaces of the fixed wing, and
wherein an end of the wing tip device facing the cut plane includes ends of the leading and trailing edges, and edges of the upper and lower surfaces of the wing tip device.

15. The aircraft of claim 14 wherein the Euler axis is obtuse to a first plane extending in a spanwise direction through the fixed wing and extending between leading and trailing edges of the fixed wing.

16. The aircraft of claim 14 wherein the wherein the cut plane is obtuse to a second plane parallel to a chord of the fixed wing.

17. The aircraft of claim 14 wherein the wing tip is configured to rotate about the Euler axis during flight of the aircraft.

18. The aircraft of claim 14, wherein the Euler axis forms an acute angle is in a range of 15 to 45 degrees with respect to a vertical direction.

19. The aircraft of claim 14, wherein the cut plane is parallel to both the end of the fixed wing and the end of the wing tip device.

20. A method to manufacture an aircraft wing comprising:
forming a fixed wing having a wing tip, wherein the wing tip has an outer surface aligned with and facing a cut plane that forms an overcut or an undercut of the wing tip device with respect to the fixed wing;
forming a wing tip device having an inward surface configured to be adjacent the outer surface of the wing tip and aligned with and facing the cut plane, and
attaching the wing tip and the wing tip device at a pivot joint along an Euler axis extending perpendicularly through the cut plane,
in which a trailing edge of the wing tip device is aligned with the fixed wing to form a substantially continuous trailing edge along the wing tip device and the fixed wing, a leading edge of the wing tip device is aligned with a leading edge of the fixed wing to form a substantially continuous leading edge along the wing and wing tip device, an upper surface of the wing tip device is aligned with an upper surface of the fixed wing to form a substantially continuous upper surface of the wing and wing tip device, and a lower surface of the wing tip device is aligned with a lower surface of the fixed wing to form a substantially continuous lower surface of the fixed wing and wing tip device;
wherein the outer surface of the wing tip of the fixed wing includes ends of the leading and trailing edges and edges of the upper and the lower surfaces of the fixed wing, and
wherein the inward surface of the wing tip device includes ends of the leading and trailing edges and edges of the upper surface and the lower surface of the wing tip device.

21. The method of claim 20 wherein the cut plane forms an acute angle with a first plane extending in a spanwise direction through the fixed wing and extending between leading and trailing edges of the fixed wing.

22. The method of claim 20 wherein the wherein the cut plane forms an acute angle with a second plane parallel to a chord of the fixed wing.

23. The method of claim 20 wherein the wing tip is configured to rotated about the Euler axis during flight of the aircraft.

24. The method of claim 20, wherein the Euler axis forms an acute angle is in a range of 15 to 45 degrees with respect to a vertical direction.

25. The method of claim 20, wherein the cut plane is parallel to both the outer surface of the fixed wing and the inward surface of the wing tip device.

* * * * *